Patented Feb. 15, 1927.

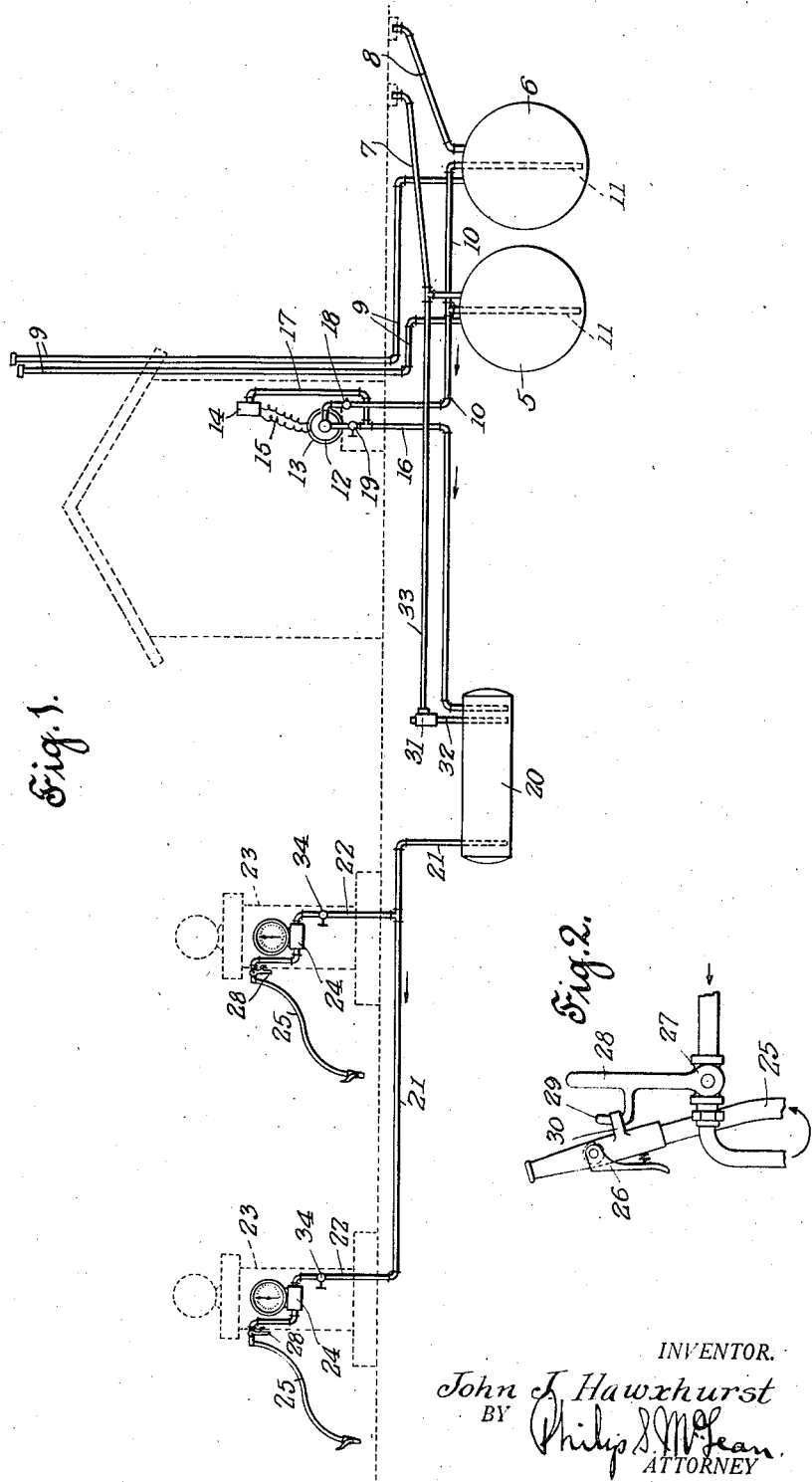

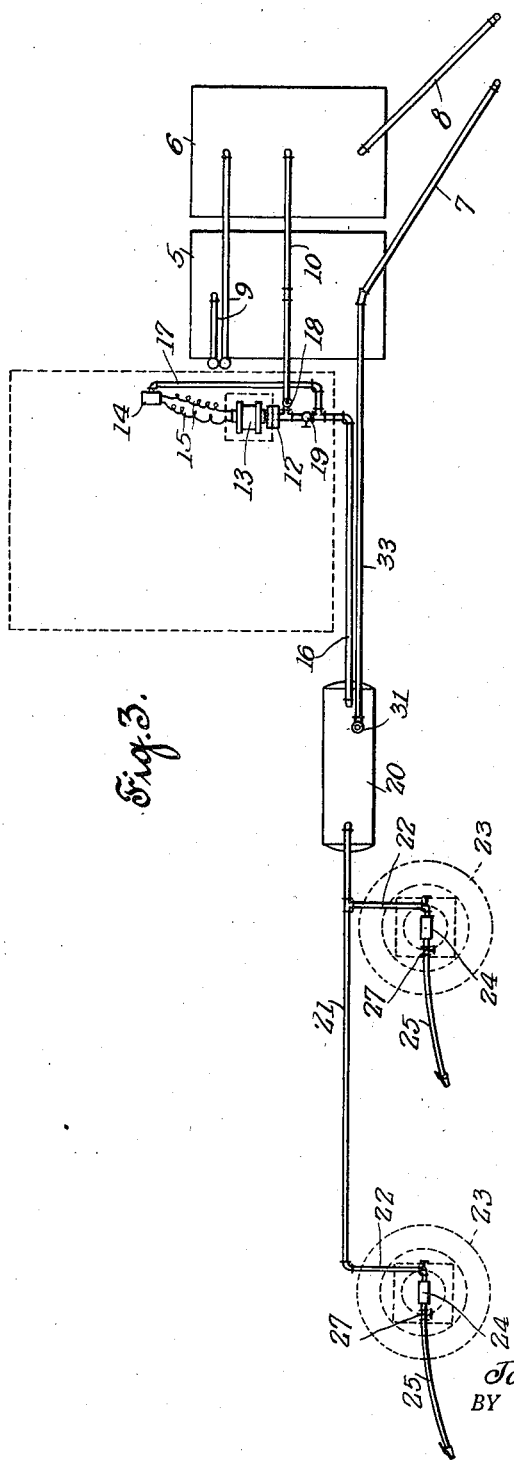

1,618,006

UNITED STATES PATENT OFFICE.

JOHN J. HAWXHURST, OF BROOKLYN, NEW YORK, ASSIGNOR OF ONE-FOURTH TO M. J. SAGE, OF BROOKLYN, NEW YORK; ONE-FOURTH TO GEORGE W. STEDWELL, OF NEW YORK, N. Y; AND ONE-FOURTH TO FREDERICK W. LANG, OF BROOKLYN, NEW YORK.

LIQUID-DELIVERY SYSTEM.

Application filed October 4, 1926. Serial No. 139,272.

This invention relates to the delivery of gasoline or the like and the general objects of the invention are to provide a simple, practical system for storing the liquid in bulk and delivering it as required in measured quantities.

Special objects of the invention are to automatically maintain a desired delivery pressure on the liquid, to guard against an excess of pressure at any time, to insure quick accurate measurement of the liquid as required and to guard against loss by accidental operation of the delivery mechanism.

These objects are attained by certain novel features of construction, combinations and relations of parts as set forth in the following specification.

The drawings accompanying and forming part of this specification illustrate one practical embodiment of the invention and it should be understood that the structure may be varied from this particular disclosure without departure from the true spirit and broad scope of the invention as hereinafter defined and claimed.

Figure 1 is a more or less diagrammatic representation of a gasoline filling station having the invention incorporated therein.

Figure 2 is a broken detail view of the combined valve and hanger for the valve nozzle, preventing delivery of the liquid until after the nozzle is removed from the hook and the valve is turned to open up the pressure supply.

Figure 3 is a plan view of the apparatus shown in Figure 1.

In the present disclosure two storage tanks are provided at 5, 6 having curb filling lines 7, 8. These tanks are vented by pipe lines 9 extended to a suitable height as indicated.

The liquid is withdrawn from the storage tanks by a suction line 10 having branches 11 entering the two tanks. The suction line communicates with the pump 12 driven by an electric motor 13. This motor is controlled by a suitable pressure governed switch 14 shown as having suitable electrical connections 15 with the motor. The pressure for operating the switch is taken off from the delivery line 16 of the pump by a branch line 17. An upwardly opening check valve 18 in the suction line prevents back flow from the pump into the storage tanks and a globe valve or the like is indicated at 19 to enable the discharge line being closed off when that is desirable.

The pump discharges into the pressure tank 20 and from this tank a delivery line 21 extends by way of branches 22 to the various filling stands 23.

Suitable measuring devices such as meters 24 are provided at the filling stands and the final delivery is shown as effected by flexible hose 25 having nozzle valve 26 and controlled by hand valves 27. The latter are shown as half-turned valves having operating lever handles 28 equipped with hooks 29 to receive the supporting rings 30 of the nozzles. As shown in Figure 2 these hooks are placed so that they will support the nozzles only when the valves are turned to the closed position indicated.

To guard against excess pressure, a pressure relief valve is shown at 31 connected with the pressure tank by piping 32 and having a return line 33 extending back to the filling line 7 so as to automatically return any excess liquid back to the first storage tank.

Valves are indicated at 34 in the delivery branches leading to the stands, enabling any stand to be cut off at any time.

The motor, pump and pressure tank are designed with a view to furnish an ample supply to all the stands of the system so that any one or all of them may be in use as conditions demand. The operation of the motor is dependent upon the pressure in the pressure tank and therefore starts pumping as soon as the pressure in that tank falls below the pressure for which the Mercoid switch is set and this irrespective of whether any of the stands are in use or the system is standing idle. Consequently, the stands are ready to deliver at any time upon removing the nozzles from the valve hooks and turning said valve hooks to open the pressure supply to the hoses. The operator can then deliver any desired quantity by simply operating the nozzle valve, the quantity being delivered showing as it passes through the meter. Yet, if the pump should at any time build up an excessive pressure in the pressure tank, the same is automatically released and the liquid returned to the storage tank by the automatic pressure relief valve.

In will be noted in Figure 1 that the liquid feed line 16, the pressure relief line 32 and the liquid delivery line 21 all extend down into the pressure tank to a point near the bottom of the same. This is for the purpose of trapping a certain amount of air in the pressure tank. When liquid is first pumped into this tank, it will be seen that as soon as the liquid covers the lower ends of these pipes, the air in the tank is automatically trapped and is compressed by the liquid entering the tank until it forms both a cushion and a pressure medium for expelling the contents of the tank. This pressure medium is effective at all times and is of particular utility in insuring immediate delivery of liquid. As soon as the delivery valves are opened, the force of this cushion becomes effective to supply a solid stream of liquid at the delivery nozzle and this cushion is sufficient to insure the delivery of a solid stream until the pump comes into operation. Thus the delivery of liquid is continuous and uninterrupted and the system is capable of delivering liquid immediately whenever required. If for any reason the switch 14 should fail to operate and the pump starts to build up an excessive pressure in the pressure tank then when the pressure is reached for which the relief valve 31 is set, said valve will operate to pass liquid from the pressure tank back to the supply tank and thus relieve the excess.

What is claimed is:

1. In liquid delivery apparatus, a storage tank, a delivery tank above the lowest level of the storage tank, a delivery line extending from the lower portion of said delivery tank, a liquid transfer line extending from the storage tank into the lower portion of the delivery tank, a pump connected in said transfer line and adapted by its operation in transferring liquid from the storage tank to the delivery tank to compress a quantity of air in the top of the delivery tank, and means subjected to the pressure within the delivery tank for operating said pump to transfer liquid from the storage tank to the delivery tank as required to maintain a predetermined delivery pressure in said delivery tank.

2. In liquid delivery apparatus, a storage tank, a delivery tank above the lowest level of said storage tank, a delivery line extending from the lower portion of said delivery tank, a pump and connections for transferring liquid from the storage tank into the delivery tank, the transfer connection having an entry into the delivery tank independently of the delivery line so as to build up a cushion of compressed air within the delivery tank above the liquid therein, and means subjected to the pressure within the delivery tank for operating said pump to transfer liquid from the storage tank into the delivery tank as required to maintain predetermined pressure within the delivery tank.

3. In liquid delivery apparatus, a storage tank, a delivery tank above the lowest level of said storage tank, a delivery line extending from the lower portion of said delivery tank, a pump and connections for transferring liquid from the storage tank into the delivery tank, the transfer connection having an entry into the delivery tank independently of the delivery line so as to build up a cushion of compressed air within the delivery tank above the liquid therein, means subjected to the pressure within the delivery tank for operating said pump to transfer liquid from the storage tank into the delivery tank as required to maintain predetermined pressure within the delivery tank, and an automatic relief also subjected to the pressure within the delivery tank for automatically returning liquid from the delivery tank back to the storage tank in the event of development of excessive pressure in the delivery tank.

4. In liquid delivery apparatus, a storage tank, a delivery tank, a liquid transfer line extending from the storage tank down into the lower portion of the delivery tank, a liquid pump interposed in said line, a liquid delivery line extending upwardly from the lower portion of said delivery tank, a check valve in the transfer line for holding pressure in the delivery tank developed by transfer of liquid from the storage tank to the delivery tank, a motor for driving the pump, and pressure actuated means subjected to the pressure within the delivery tank for controlling operation of said motor.

5. In liquid delivery apparatus, a storage tank, a delivery tank, a liquid transfer line extending from the storage tank down into the lower portion of the delivery tank, a liquid pump interposed in said line, a liquid delivery line extending upwardly from the lower portion of said delivery tank, a check valve in the transfer line for holding pressure in the delivery tank developed by transfer of liquid from the storage tank to the delivery tank, a motor for driving the pump, pressure actuated means subjected to the pressure within the delivery tank for controlling operation of said motor, and an automatic relief subjected to the pressure of the delivery tank and connected to return liquid from the delivery tank back to the storage tank.

In witness whereof, I have hereunto set my hand this 19th day of July, 1926.

JOHN J. HAWXHURST.